(12) United States Patent
Marx

(10) Patent No.: US 7,782,536 B2
(45) Date of Patent: Aug. 24, 2010

(54) USE OF METALLIZED FILMS TO CREATE HALF-MIRRORED PARTS

(75) Inventor: Curtis Lee Marx, Macungie, PA (US)

(73) Assignee: Mack Trucks, Inc., Greensboro, NC (US)

(*) Notice: Subject to any disclaimer, the term of this patent is extended or adjusted under 35 U.S.C. 154(b) by 306 days.

(21) Appl. No.: 11/886,486

(22) PCT Filed: Mar. 18, 2005

(86) PCT No.: PCT/US2005/008954

§ 371 (c)(1),
(2), (4) Date: Sep. 17, 2007

(87) PCT Pub. No.: WO2006/101485

PCT Pub. Date: Sep. 28, 2006

(65) Prior Publication Data

US 2009/0067056 A1    Mar. 12, 2009

(51) Int. Cl.
*G02B 27/14* (2006.01)
*G02B 27/00* (2006.01)

(52) U.S. Cl. ...................... 359/627; 359/609
(58) Field of Classification Search ................. 359/602, 359/603, 605, 609, 627, 629, 634, 585, 839, 359/872, 883
See application file for complete search history.

(56) References Cited

U.S. PATENT DOCUMENTS

2005/0163993 A1* 7/2005 Kawabata ................ 428/336
2007/0291384 A1* 12/2007 Wang ........................ 359/883

* cited by examiner

*Primary Examiner*—Alicia M Harrington
(74) *Attorney, Agent, or Firm*—Martin Farrell; Michael Pruden

(57) ABSTRACT

The present invention provides half-mirrored parts and methods for creating half-mirrored parts. A half-mirrored part according to one particular embodiment of the present includes: a formable reflective layer and a formable transparent or translucent layer, wherein the formable reflective layer is on one side of the transparent or translucent layer.

26 Claims, 10 Drawing Sheets

USE OF METALLIZED FILMS TO CREATE HALF-MIRRORED PARTS

BACKGROUND OF THE INVENTION

1. Field of the Invention

The invention relates to metallized films, and, more specifically, to the use of metallized films to create "half-mirrored" parts.

2. Discussion of the Background

The appearance of chrome is appealing to many consumers. For example, with respect to truck and car owners, many such owners desire to put chrome parts (or other shiny, reflective parts) on their trucks or cars. Conventional shiny, reflective parts are shiny and reflective no matter the angle at which one looks at the part. What is desired, however, are parts that appear shiny and reflective when viewed from one side, but appear translucent when viewed from a less brightly lit opposite side (i.e., "half-mirrored" parts).

SUMMARY OF THE INVENTION

The present invention provides half-mirrored parts and methods for creating half-mirrored parts. As used herein, a "half-mirrored" part is a part that appears (a) shiny and reflective (e.g., like chrome or other shiny, reflective material) when viewed from one side and (b) transparent or translucent when viewed from a less brightly lit opposite side.

A half-mirrored part according to one particular embodiment of the present invention includes: a formable reflective layer and a formable transparent pr translucent layer, wherein the formable reflective layer is put on one side of the transparent or translucent layer. The formable reflective layer may be laminated and/or bonded onto a side of the transparent or translucent layer. In this embodiment, the half-mirrored part appears to be a metallic part when observed from a first side and appears transparent or translucent when observed from a side opposite the first side. In some embodiments; the formable reflective layer includes: a formable clear coat film and a discontinuous layer of metal islands deposited on the formable clear coat film. The metal islands may include indium islands.

A method, according to one particular embodiment of the present invention, for creating a half-mirrored part includes: obtaining a transparent or translucent backing sheet; laminating a formable reflective film to one side of the backing sheet to create a laminated structure; and forming the laminated structure into a predetermined shape. Advantageously, the step of forming the laminated structure into the predetermined shape may include using a thermoforming process to form the laminated structure into the predetermined shape. In some embodiments, the formable reflective film may include a formable clear coat film and a discontinuous layer of metal islands deposited (directly or indirectly) on the formable clear coat film, and the discontinuous layer of metal islands may include indium islands. In additional embodiments, the formable reflective film may further include a clear coat leveling layer disposed between the discontinuous layer of metal islands and the formable clear coat film.

The half-mirrored parts of the present invention have many uses. For example, in one aspect, the present invention provides using a half-mirrored part as a sun visor for a motor vehicle or head covering. Accordingly, in some embodiments, a half-mirrored part according to an embodiment of the invention is formed into the shape of a sun visor and attached to a motor vehicle so that the half-mirrored part overhangs only a top portion of the vehicle's windshield. In this way, the half-mirrored part filters at least some of the light passing through the top portion of the windshield. In other embodiments, a half-mirrored part according to an embodiment of the invention is formed into the shape of a sun visor and attached to a cap or other head covering.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

DETAILED DESCRIPTION OF PREFERRED EMBODIMENTS

Figure 1:
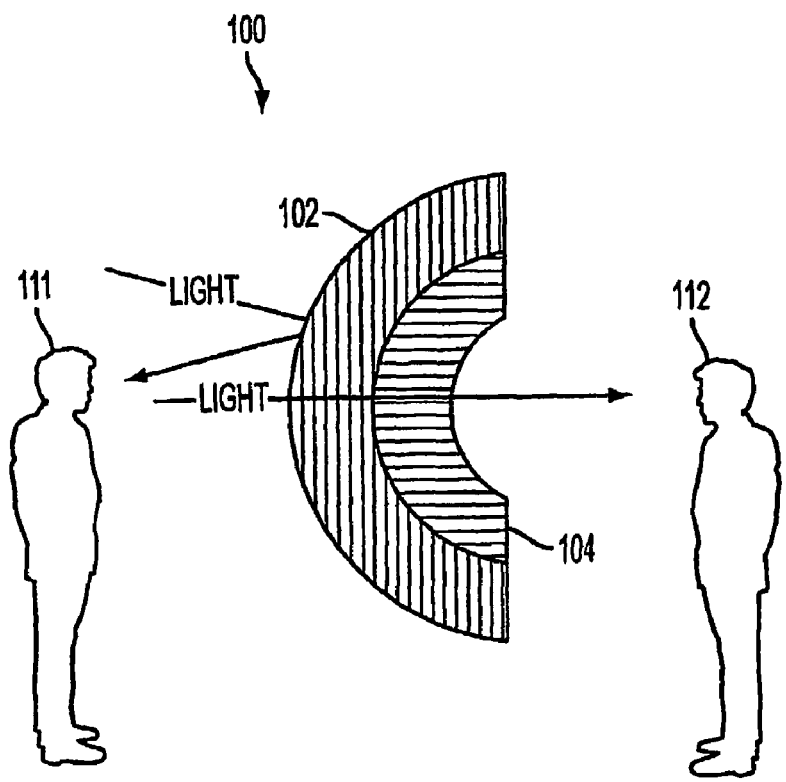
FIG. 1 is a schematic, cross-sectional view of a half-mirrored formed part according to an embodiment of the invention.

FIG. 1 is a schematic, cross-sectional view of a half-mirrored part 100 according to an embodiment of the invention. Half-mirrored part 100 includes a formable reflective layer 102 on a side of a transparent or translucent sheet 104. Sheet 104 may be made from a thermoplastic material such as an acrylic, a polyester, a polycarbonate, or other thermoplastic material or any combination of these.

From the perspective of a person 111 positioned such that person 111 faces reflective layer 102, part 100 appears shiny and reflective (e.g., part 100 may look like a chrome part). However, from the perspective of a person 112 positioned such that person 112 faces transparent or translucent layer 104, part 100 looks transparent or translucent.

Figure 2:
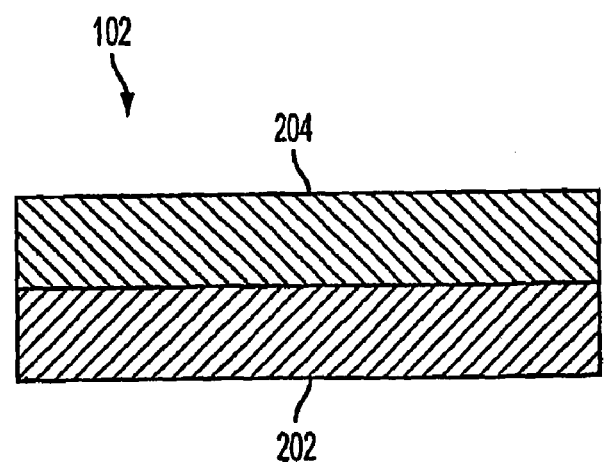
FIG. 2-6 are schematic, cross-sectional views of reflective layers according to various embodiments of the invention.

FIG. 2 is a schematic, cross-sectional view of one embodiment of formable reflective layer 102. As shown in FIG. 2, in some embodiments, layer 102 includes a formable clear coat film 202 and a discontinuous layer of metal islands 204 (e.g., indium islands or other metal islands) deposited (directly or indirectly) on the formable clear coat film 202. Although FIG. 2 illustrates layer 204 being deposited directly on clear coat film 202, this is not a requirement as layer 204 may be deposited indirectly on film 202 (i.e., one or more layers may be disposed between layer 204 and film 202) as illustrated in FIGS. 3 and 4.

Figure 3:
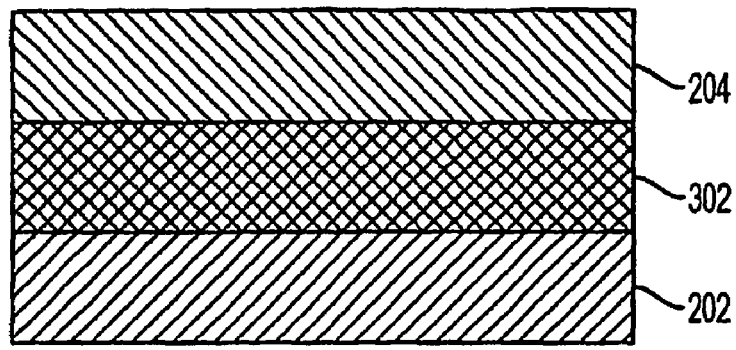
Figure 4:
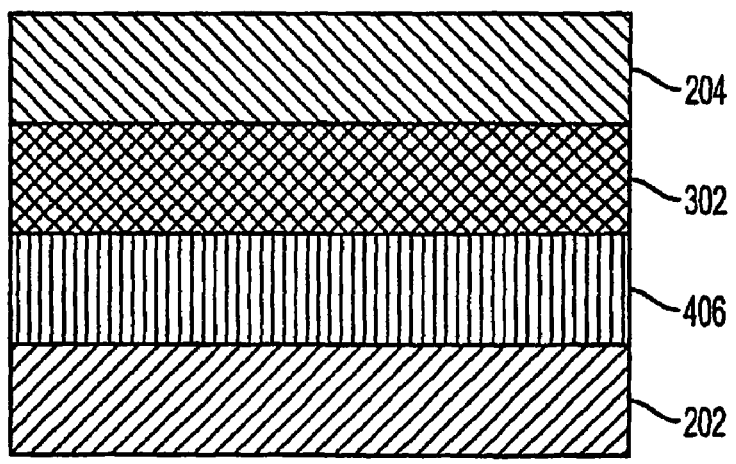

FIG. 3 is a schematic, cross-sectional view of another embodiment of reflective layer 102. As shown in FIG. 3, in some embodiments, layer 102 includes formable clear coat film 202, metal island layer 204, and a clear coat leveling layer 302 disposed between layer 204 and film 202. FIG. 4 shows an embodiment of layer 102, which embodiment is related to the embodiment shown in FIG. 3. As shown in FIG. 4, in some embodiments, reflective layer 102 may further include a primer layer 406 disposed between film 202 and leveling layer 302.

Figure 5:
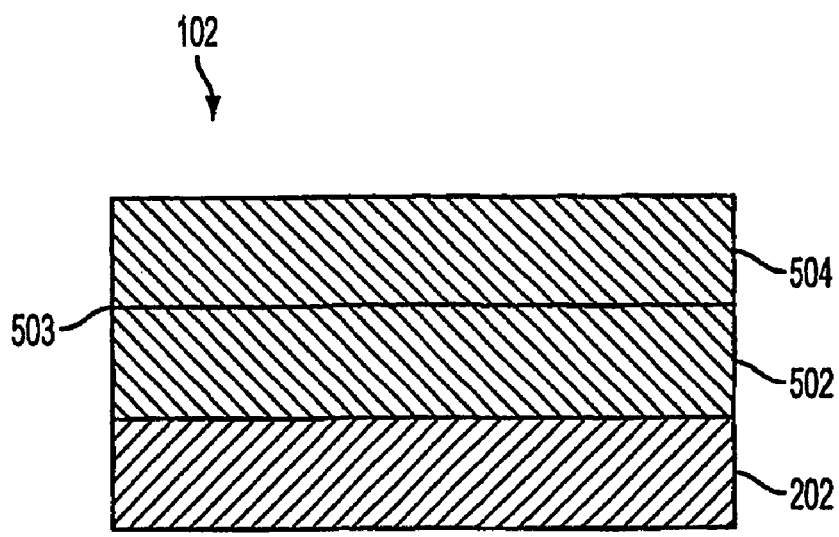
Figure 6:
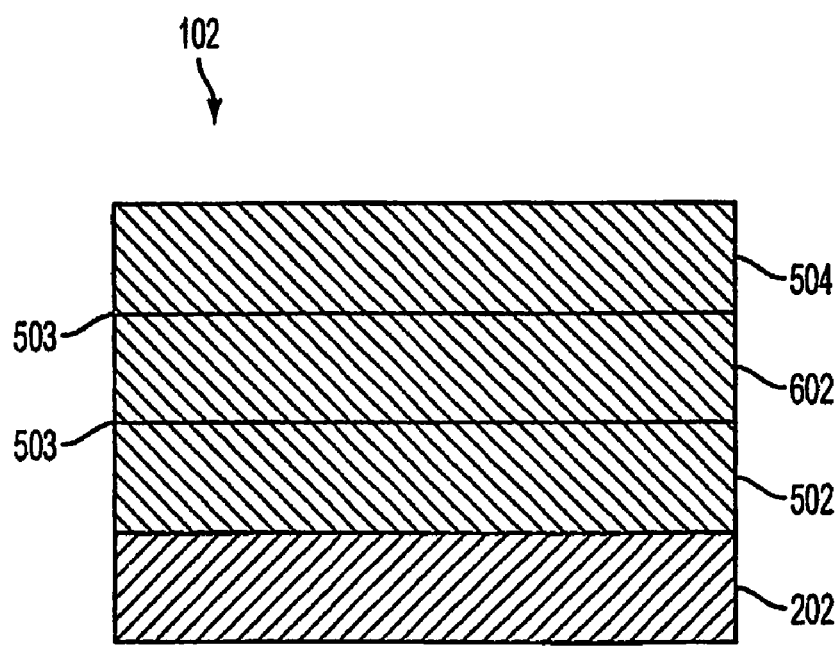

FIG. 5 is a schematic, cross-sectional view of another embodiment of reflective layer 102. As shown in FIG. 5, in some embodiments, layer 102 includes formable clear coat film 202, a first discontinuous layer of metal islands 502, and a second discontinuous layer of metal islands 504, wherein the first layer 502 is positioned between film 202 and the second layer 504. As illustrated in FIG. 6, one or more additional discontinuous layer(s) of metal islands 602 may be positioned between layers 502 and 504. Further, as illustrated in FIGS. 5 and 6, a microscopic transitional sub-layer 503 may be disposed between any two metal island layers.

A bright metallized laminate that can be used to implement layer 102 is described in U.S. Pat. No. 6,565,955 and in U.S. Pat. App. Pub. No. 2003/0031891 (the contents of both publications are incorporated herein by this reference). Additionally, Soliant LLC., of Lancaster, S.C., produces a bright metallized laminate under the trademark Fluorex® Bright. The Fluorex® Bright product can be used to implement reflective layer 102.

Figure 7:
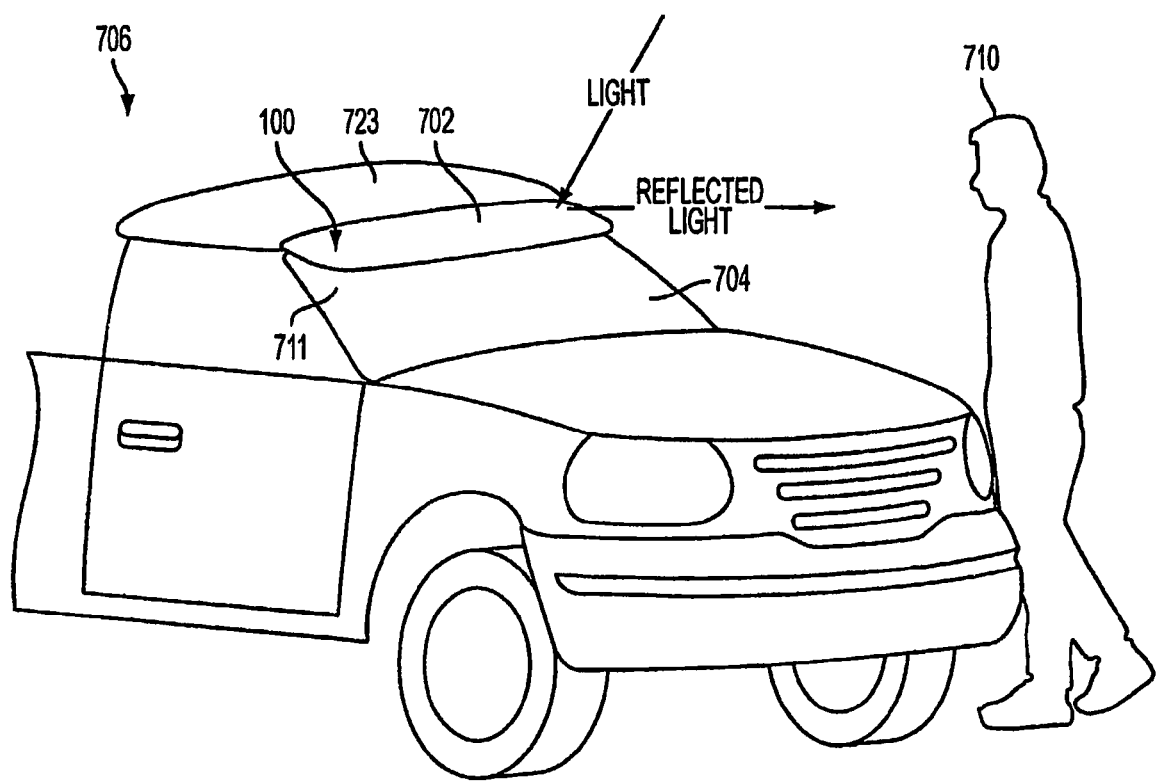
FIG. 7 illustrates using a half-mirrored part as a sun visor for use with a motor vehicle.

There are many applications for half-mirrored part 100. For example, as illustrated in FIG. 7, half-mirrored part 100 may be used as a sun visor 702 above a windshield 704 of a motor vehicle 706 (e.g., a car or truck). That is, sun visor 702 may be connected to a roof 723 of vehicle 706 and cover at least a portion of windshield 704. As shown in FIG. 7, in one embodiment, sun visor 702 overhangs only a top portion 711 of windshield 704.

Figure 8:
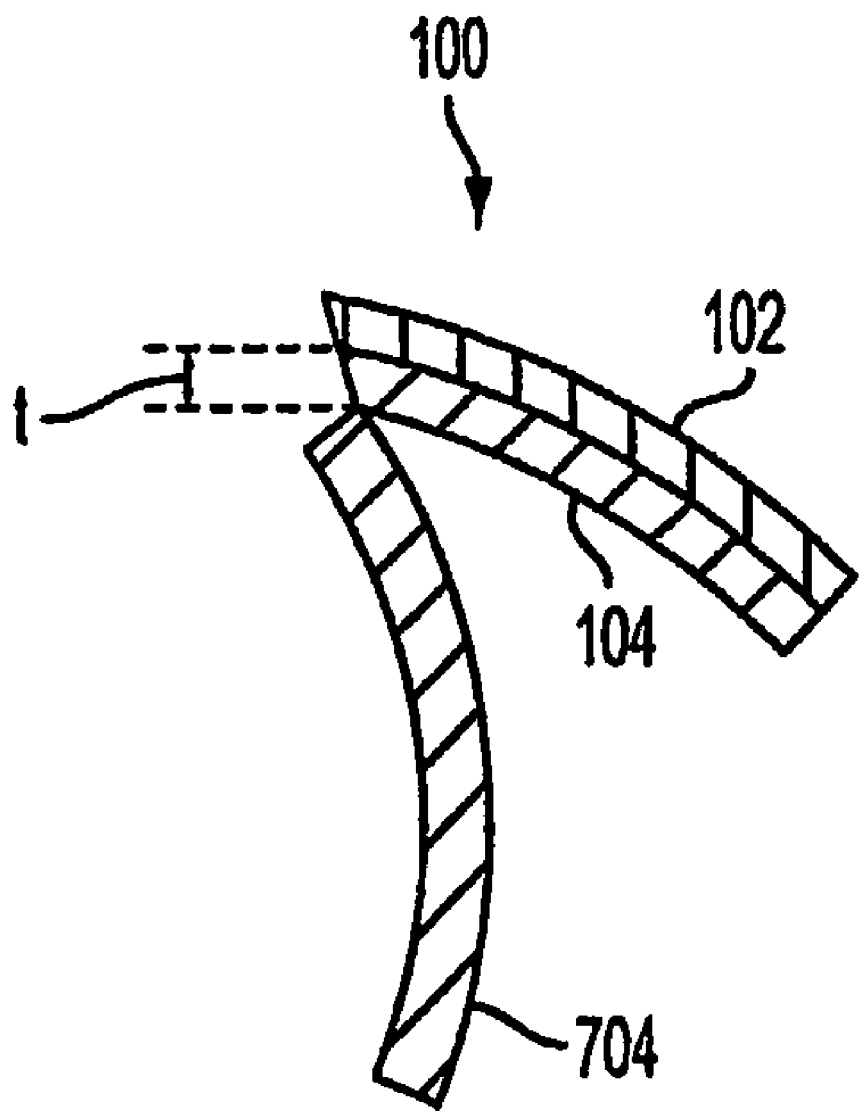
FIG. 8 is an edge view of a half-mirrored sun visor of an embodiment of the invention installed adjacent a windshield of a motor vehicle.

Preferably, as shown in FIG. 8, reflective layer 102 faces the sky or away from windshield 704, whereas transparent or translucent sheet 104 faces downwards or towards the windshield 704. Additionally, in this embodiment, the thickness (t) of sheet 104 generally ranges between 0.5 and 15 millimeters (mm), with a preferred range of 1 to 10 mm, more preferably 1 to 8 mm.

From the perspective of a person 710 looking at sun visor 702 from outside motor vehicle 706, sun visor 702 looks shiny and reflective. For example, in some embodiments, sun visor 702 has the appearance of chrome or other shiny metallic substance. However, from the perspective of a person (not shown) sitting in the driver's seat or front passenger's seat of motor vehicle 7.06, sun visor 702 appears transparent or translucent. In this way, a half-mirrored part 100 of the present invention can, among other things, provide an improved sun visor that filters some of the light entering the motor vehicle. That is, a sun visor that looks shiny and reflective when viewed from one side and appears translucent when viewed through from a less brightly lit opposite side.

Figure 9:
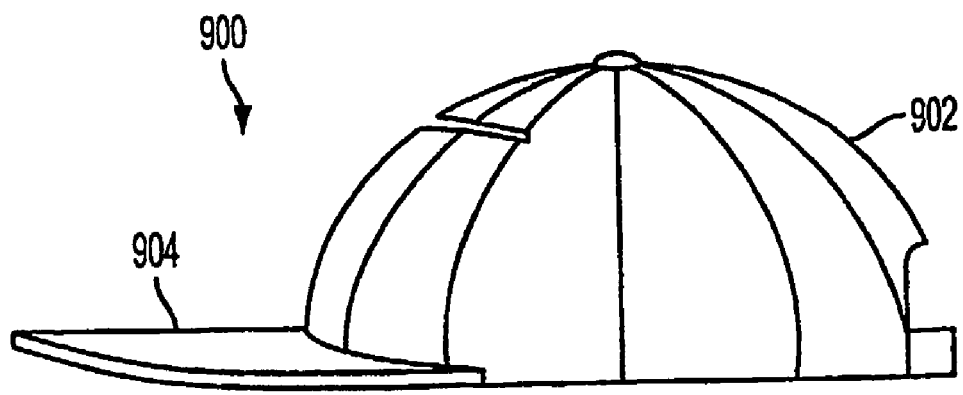
FIG. 9 illustrates a head covering according to an embodiment of the invention.

Referring now to FIG. 9, FIG. 9 illustrates a head covering 900 according to an embodiment of the invention. Head covering 900 includes a head covering portion 902 and a sun visor portion 904 connected to head covering portion. Although head covering 900 resembles a baseball cap, other head coverings are contemplated (e.g., cowboy hats and other head coverings).

Figure 10:
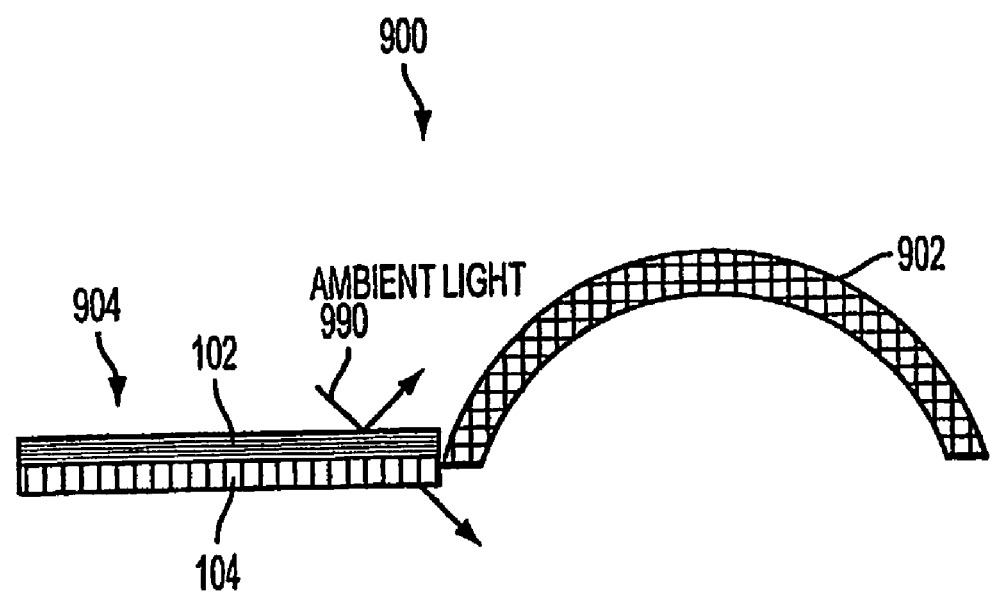
FIG. 10 is an edge view of a head covering according to an embodiment of the invention.

In the embodiment shown, sun visor 904 is a half-mirrored sun visor. Accordingly, part 100 may be used to implement sun visor portion 904. This feature is more clearly seen in FIG. 10, which is a cross-sectional, side view of head covering 900. As shown in FIG. 10, sun visor portion 904 may include reflective layer 102 disposed on transparent or translucent sheet 104. Preferably, as shown in FIG. 10, sun visor portion 904 is arranged so that when head covering 900 is worn on a person's head, reflective layer 102 faces generally upwardly and sheet 104 faces generally-downwardly. That is, when head covering 900 is worn on a person's head, ambient light 990 that passes through visor portion 904 and reaches the person's face would first pass through reflective portion 102 and then through sheet 104 before reaching the person's face.

Figure 11:
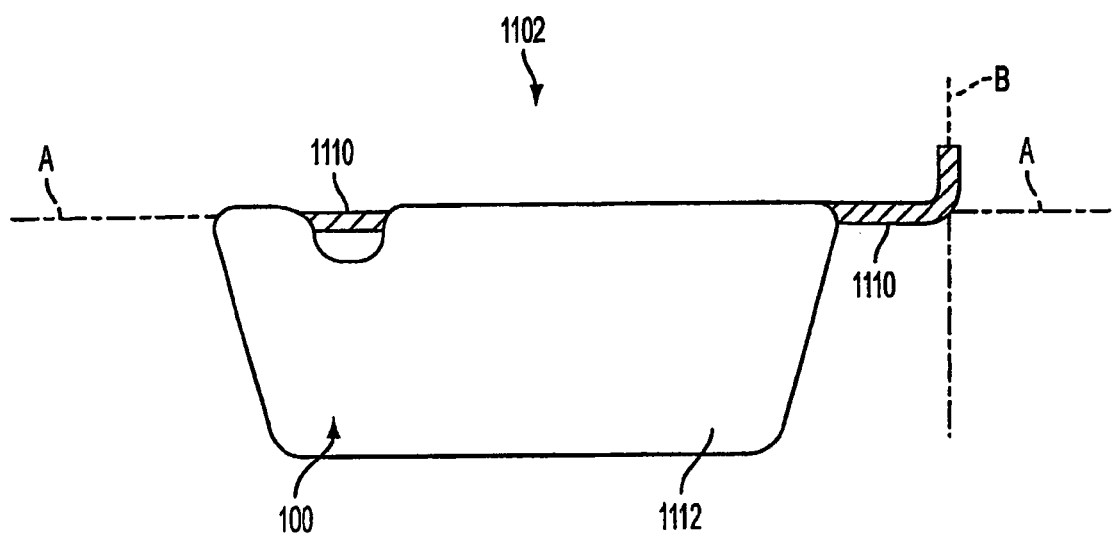
FIGS. 11-13 illustrate various uses for a half-mirrored part according to embodiments of the invention.
Figure 12:
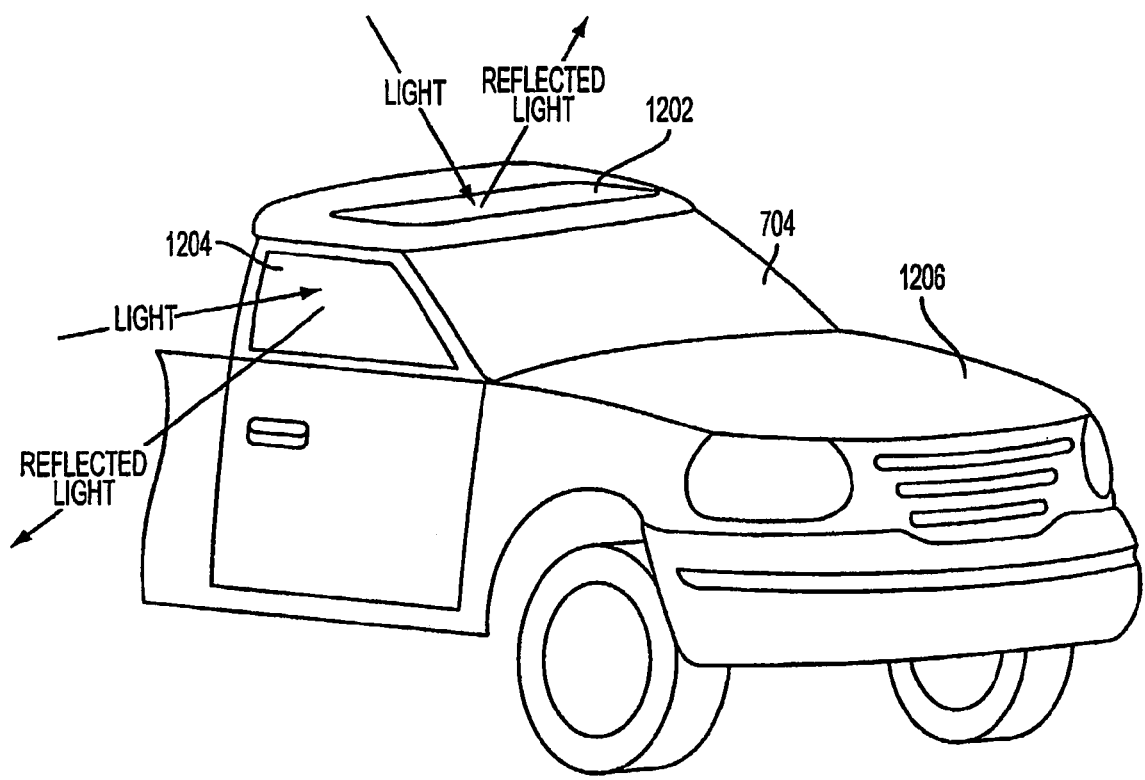
Figure 13:
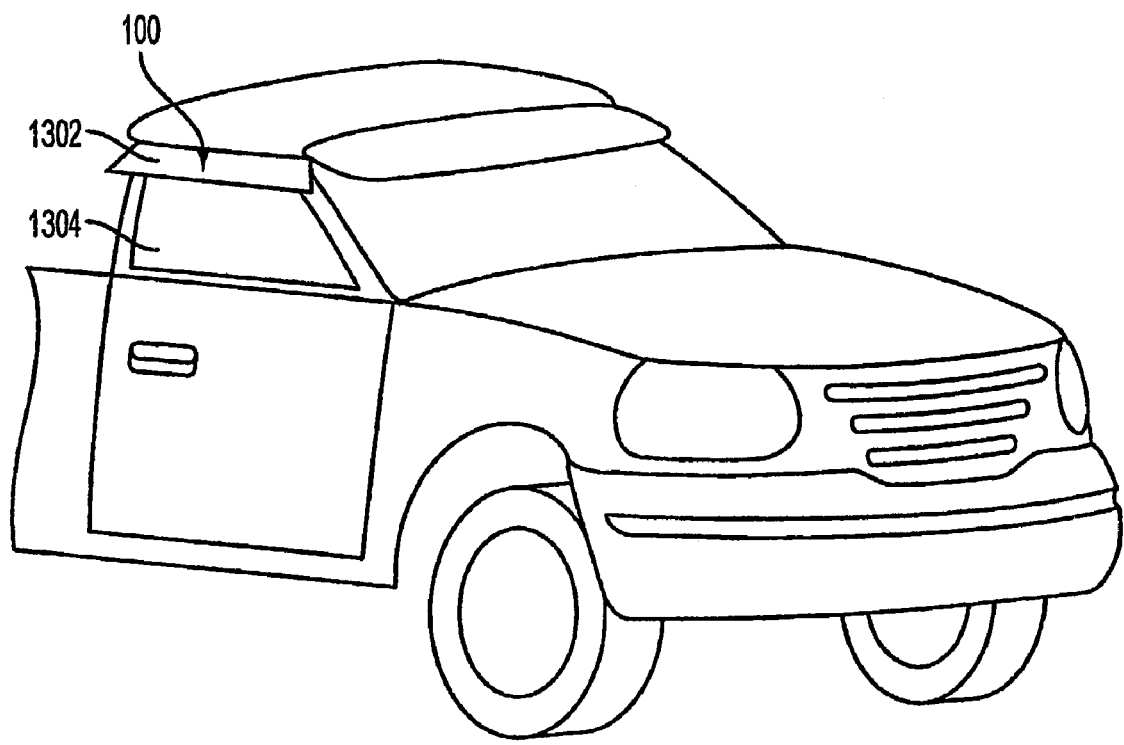

FIGS. 11-13 illustrate other uses for a half-mirrored part according to an embodiment of the invention.

As illustrated in FIG. 11, in some embodiments, a half-mirrored part 100 may be used as an interior sun visor 1102 of a motor vehicle. That is, in one aspect, the invention provides a motor vehicle having an interior sun visor 1102, wherein at least a portion of the interior sun visor comprises a half-mirrored part 100. In one embodiment, as shown in FIG. 11, sun visor 1102 includes a frame 1110 and a sun visor portion 1112 attached to frame 1110. Frame 1110 is preferably pivotally connected to an interior of a motor vehicle so that sun visor 1102 can rotate about an axis B. Additionally, portion 1112 may be rotatable about the longitudinal axis A of frame 1110 between an up and a down position. Preferably, sun visor portion 1112 consists essentially of or comprises a half-mirrored part 100.

As illustrated in FIG. 12, in some embodiments, a half-mirrored part 100 may be used as a vista window 1202 (e.g., a sunroof or moonroof or other vista window) or a side window 1204 (e.g., a bay window or other side window) of a motor vehicle 1206. That is, windows 1202, 1204 may be half-mirrored parts as described herein. And as illustrated in FIG. 13, in some embodiments, a half-mirrored part 100 may be used as a window trim overhang 1302 that overhangs, for example, a side window 1304 of a motor vehicle 1306 or other window.

Figure 14:
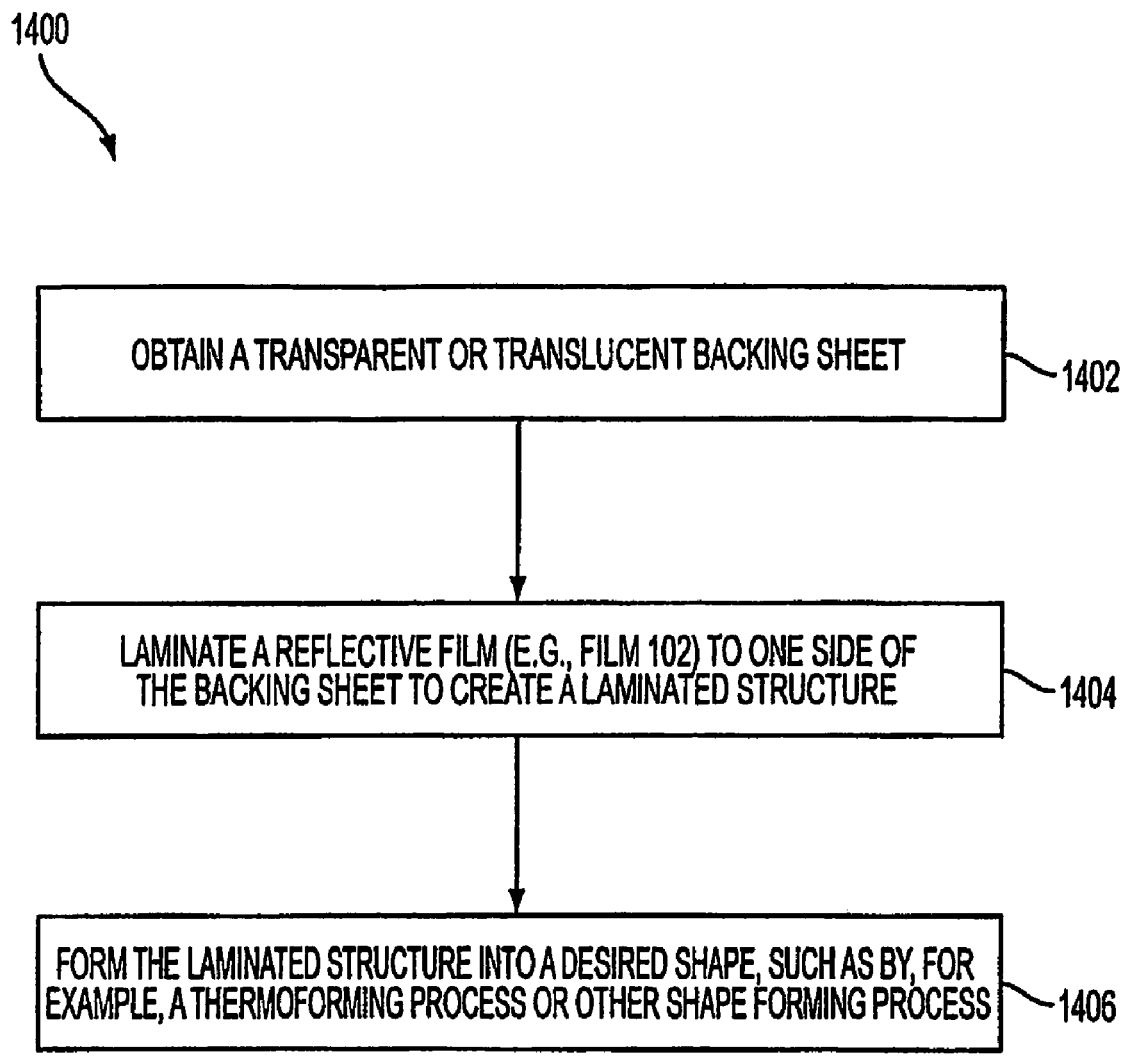
FIG. 14 is a flow chart illustrating a process according to an embodiment of the invention.

Referring now to FIG. 14, FIG. 14 is a flow chart illustrating a process 1400, according to an embodiment of the invention, for creating a half-mirrored part 100. Process 1400 may begin in step 1402 where a transparent or translucent backing sheet is obtained (e.g., sheet 104). In step 1404, a reflective film (e.g., film 102) is laminated to one side of the backing sheet to create a laminated structure. In step 1406, the laminated structure is formed into a desired shape, such as by, for example, a thermoforming process or other shape forming process. As discussed above with respect to FIGS. 7 and 9, the desired shape may be the shape of a sun visor for a motor vehicle or for a head covering, but other desired shapes are contemplated.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the process described above and illustrated in the drawings is shown as a sequence of steps, this was done solely for the sake of illustration. Accordingly, it is contemplated that some steps may be added and other steps omitted, and the order of the steps may be re-arranged.

What is claimed is:

1. A half-mirrored part, comprising:
a formable reflective layer and a formable transparent or translucent layer, wherein:

the formable reflective layer is on one side of the transparent or translucent layer;

the half-mirrored part appears to be a metallic part when observed from a first side and is transparent or translucent when observed from a side opposite the first side;

the formable reflective layer comprises:
a formable clear coat film; and
a discontinuous layer of metal islands deposited on the formable clear coat film.

2. The half-mirrored part of claim 1, wherein the transparent or translucent layer comprises a thermoplastic material.

3. The half-mirrored part of claim 1, wherein the transparent or translucent layer has a thickness ranging between about 0.5 and 15 millimeters.

4. The half-mirrored part of claim 1, wherein the discontinuous layer of metal islands is deposited directly on the formable clear coat film and the metal islands include indium islands.

5. The half-mirrored part of claim 1, wherein the formable reflective layer further comprises a clear coat leveling layer disposed between the discontinuous layer of metal islands and the formable clear coat film.

6. The half-mirrored part of claim 5, wherein the formable reflective layer comprises a primer layer disposed between the formable clear coat film and the clear coat leveling layer.

7. The half-mirrored part of claim 1, wherein the half-mirrored part has an appearance of chrome when observed from a first side and appears transparent or translucent when observed from a side opposite the first side.

8. A motor vehicle comprising the half-mirrored part of claim 1 and a windshield, wherein the half-mirrored part is disposed so that the half-mirrored part overhangs at least a top portion of the windshield, and wherein at least a portion of the light passing through said top portion of the windshield is filtered by the half-mirrored part.

9. The motor vehicle of claim 8, wherein the transparent or translucent layer has a thickness ranging between about 0.5 and 15 millimeters.

10. The motor vehicle of claim 8, wherein the discontinuous layer of metal islands is deposited directly on the formable clear coat film and the transparent or translucent layer comprises a thermoplastic material.

11. The motor vehicle of claim 8, wherein the formable reflective layer further comprises a clear coat leveling layer disposed between the discontinuous layer of metal islands and the formable clear coat film.

12. The motor vehicle of claim 11, wherein the formable reflective layer comprises a primer layer disposed between the formable clear coat film and the clear coat leveling layer.

13. A head covering comprising a head covering portion and the half-mirrored part of claim 1, wherein the half-mirrored part is connected to the head covering portion and functions as a sun visor.

14. The head covering of claim 13, wherein the head covering portion is in the shape of a cap and the half-mirrored part is in the shape of a sun visor.

15. A motor vehicle comprising the half-mirrored part of claim 1 and a side window, wherein the half-mirrored part is disposed so that the half-mirrored part overhangs at least a top portion of the side window, and wherein at least a portion of the light passing through said top portion of the side window is filtered by the half-mirrored part.

16. A motor vehicle comprising a window, wherein the window is formed from the half-mirrored part of claim 1.

17. A motor vehicle comprising an interior sun visor, wherein the interior sun visor comprises a half-mirrored according to claim 1.

18. A method for making a half-mirrored part, comprising:
obtaining a formable transparent or translucent backing sheet;
laminating a formable reflective film to one side of the backing sheet to create a laminated structure; and
forming the laminated structure into a predetermined shape, wherein the half-mirrored part has an appearance of a metallic part when observed from a first side and appears transparent or translucent when observed from a side opposite the first side.

19. The method of claim 18, wherein the step of forming the laminated structure into the predetermined shape comprises using a thermoforming process to form the laminated structure into the predetermined shape.

20. The method of claim 18, wherein the backing sheet comprises a thermoplastic material.

21. The method of claim 18, wherein the backing sheet has a thickness ranging between about 0.5 and 15 millimeters.

22. The method of claim 18, wherein the formable reflective film comprises a formable clear coat film and a discontinuous layer of metal islands deposited on the formable clear coat film.

23. The method of claim 22, wherein the discontinuous layer of metal islands is deposited directly on the formable clear coat film.

24. The method of claim 22, wherein the discontinuous layer of metal islands comprises indium islands.

25. The method of claim 22, wherein the formable reflective film further comprises a clear coat leveling layer disposed between the discontinuous layer of metal islands and the formable clear coat film.

26. A half-mirrored part, comprising:
a formable reflective layer and a transparent or translucent layer, wherein:
the formable reflective layer is on one side of the transparent or translucent layer;
the half-mirrored part appears to be a metallic part when looked at from a first side and is transparent or translucent when looked at from a side opposite the first side; and
the formable reflective layer comprises indium islands.

* * * * *